United States Patent [19]

Spazierer et al.

[11] Patent Number: 4,797,520

[45] Date of Patent: Jan. 10, 1989

[54] SWITCH, ESPECIALLY FOR MOTOR VEHICLES

[75] Inventors: Hubert Spazierer; Adam Weber, both of Bietigheim-Bissingen, Fed. Rep. of Germany

[73] Assignee: SWF Auto-Electric GmbH, Bietigheim-Bissingen, Fed. Rep. of Germany

[21] Appl. No.: 110,629

[22] Filed: Oct. 19, 1987

Related U.S. Application Data

[63] Continuation of Ser. No. 907,448, Sep. 15, 1986, abandoned.

[30] Foreign Application Priority Data

Sep. 17, 1985 [DE] Fed. Rep. of Germany ....... 3533055

[51] Int. Cl.[4] .............................................. H01H 9/02
[52] U.S. Cl. ....................................... 200/295; 200/4; 200/317
[58] Field of Search .... 200/61.27, 61.54, 61.62–61.82, 200/294–296, 317

[56] References Cited

U.S. PATENT DOCUMENTS

| 3,701,870 | 10/1972 | Sorenson | 200/295 |
| 3,727,021 | 4/1973 | Preis | 200/295 |
| 4,327,264 | 4/1982 | Botz et al. | 200/295 |
| 4,434,339 | 2/1984 | Ohashi | 200/295 |
| 4,554,618 | 11/1985 | Bafunno et al. | 200/61.82 X |

FOREIGN PATENT DOCUMENTS

| 1728094 | 8/1956 | Fed. Rep. of Germany . |
| 7142912 | 11/1971 | Fed. Rep. of Germany . |
| 2947644 | 8/1981 | Fed. Rep. of Germany . |
| 3228931 | 2/1984 | Fed. Rep. of Germany . |

Primary Examiner—J. R. Scott
Attorney, Agent, or Firm—James B. Raden

[57] ABSTRACT

A switch, especially for motor vehicles, includes a housing which is insertable into an opening of a mounting plate. The housing is limited by a front plate, several side walls and a base plate. Locking springs project from two side walls. Each locking spring carries a stud. When the switch is mounted the studs snap into position behind the mounting plate. Release shanks projecting into the housing interior originate from the locking spring, which release shanks end in the area of apertures in the front plate. Thus the mounting plate need not have openings through which the locking springs are accessible for removal of the switch. Thus the switch can be surrounded by the mounting plate over the entire perimeter of its front plate.

14 Claims, 4 Drawing Sheets

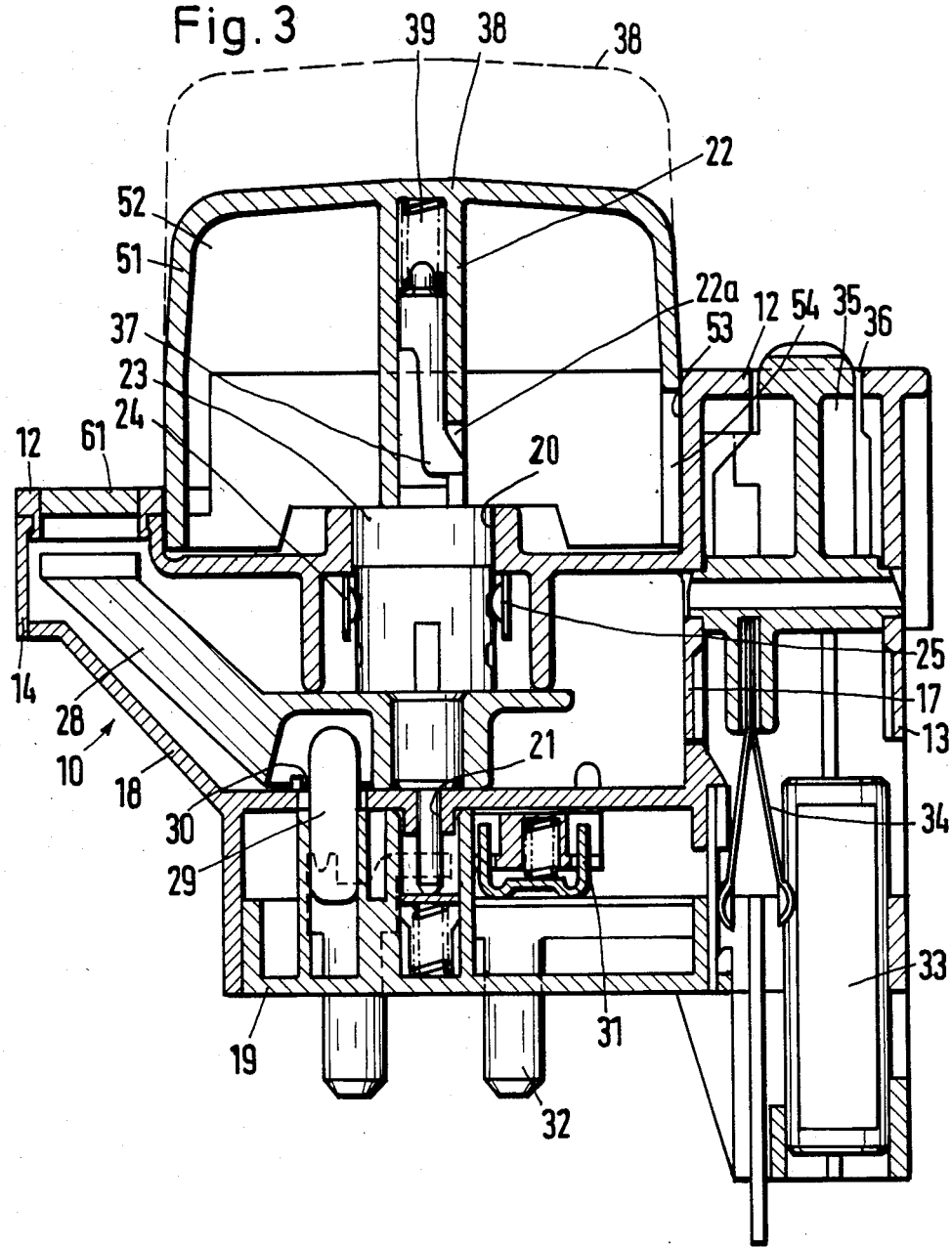

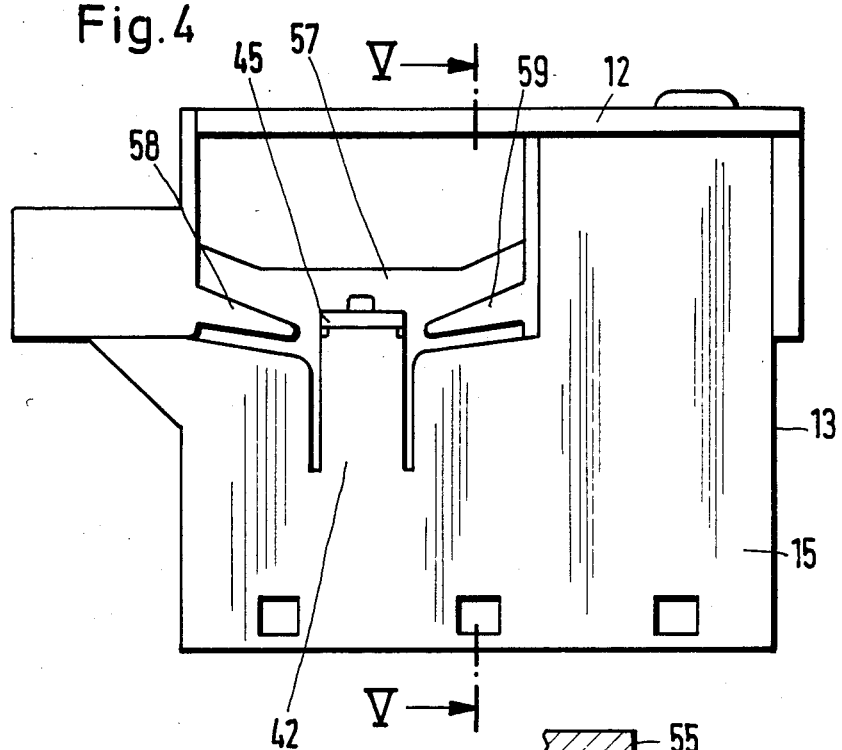
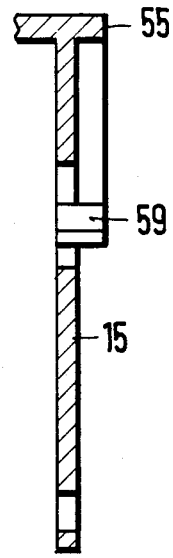

SWITCH, ESPECIALLY FOR MOTOR VEHICLES

This application is a continuation of application Ser. No. 907,448, filed Sept. 15, 1986, now abandoned.

BACKGROUND OF THE INVENTION

This invention pertains to a panel mounted switch.

In switches on motor vehicles to be inserted in a mounting plate, for example the instrument panel, lockable fastening means are necessary. West German Patent No. 3,228,931 shows a switch which has locking springs fastened on two side walls. The locking springs snap behind the mounting plate, when the housing is inserted and thereby fasten the switch on the mounting plate.

When the locking springs are not accessible from the base plate of the switch, which is generally the case where the mounting plate serves as an instrument panel on motor vehicles, openings have to be provided in the mounting plates, through which openings the locking springs are accessible, so that the switch can be detached from the mounting plate, if required. However for styling and production engineering reasons car manufacturers often do not wish to have openings of this kind in the mounting plates.

SUMMARY OF THE INVENTION

It is one object of the invention to develop a switch which may be easily and reliably secured on a mounting plate, but if necessary, can also be easily removed from it.

In accordance with the invention a switch, especially for motor vehicles, includes a housing which is insertable into an opening of a mounting plate. The housing is limited by a front plate, several side walls and a base plate. Locking springs project from two side walls. Each locking spring carries a stud. When the switch is mounted the studs snap into position behind the mounting plate. Release shanks projecting into the housing interior originate from the locking spring, which release shanks end in the area of apertures in the front plate. Thus the mounting plate need not have openings through which the locking springs are accessible for removal of the switch. Thus the switch can be surrounded by the mounting plate over the entire perimeter of its front plate.

By arranging the switch so that the apertures are covered by the switch control button, or arranging the control button to permit access to the aperture in only one of several positions inadvertent release of the locking spring is prevented, when the switch is actuated.

When the aperture in the mounting plate is covered by the switch control button, actuation of the locking spring is made possible or facilitated, when the switch control button is detachably fastened on its switch shaft.

Release of the locking spring is facilitated, when its release shank projects from the front plate. A release shank of this kind does not deteriorate the appearance of the switch, if the release shank is covered completely about its entire portion projecting from the front plate. For example, the release shank can be covered by a tube-shaped portion of the switch control button. If the front plate thereby extends completely around the tube-shaped portion of the switch control button, the switch control button may be axially displaceable. In cases of this kind the recess, through which the fastening means between switch control button and switch shaft are accessible, is preferably uncovered in an elevated axial position. When the front plate does not surround the tube-shaped portion about its entire perimeter the switch control button need not necessarily be axially displaceable. It is sufficient, for the switch control button to be swivellable or displaceable relative to the front plate. The recess through which the fastening means between switch control button and switch shaft are accessible is then uncovered in a particular swiveling position or displacing position of the switch control button.

When the switch control button is detachably fastened on its switch shaft it can be especially easily removed if a resilient element is arranged between itself and the switch shaft.

If required the switch can be particularly easily removed from the mounting plate, when a resilient lug is arranged on one side wall. When the release shank of the locking spring is actuated, the resilient lug presses the switch out of the opening in the mounting plate.

BRIEF DESCRIPTION OF THE DRAWING

FIG. 3 is a further sectional view through the switch of FIG. 1 taken at right angles to line II—II;

FIG. 4 is a side view of the switch; and

FIG. 5 is a section taken on the line V—V of FIG. 4.

DETAILED DESCRIPTION

Figure 1:
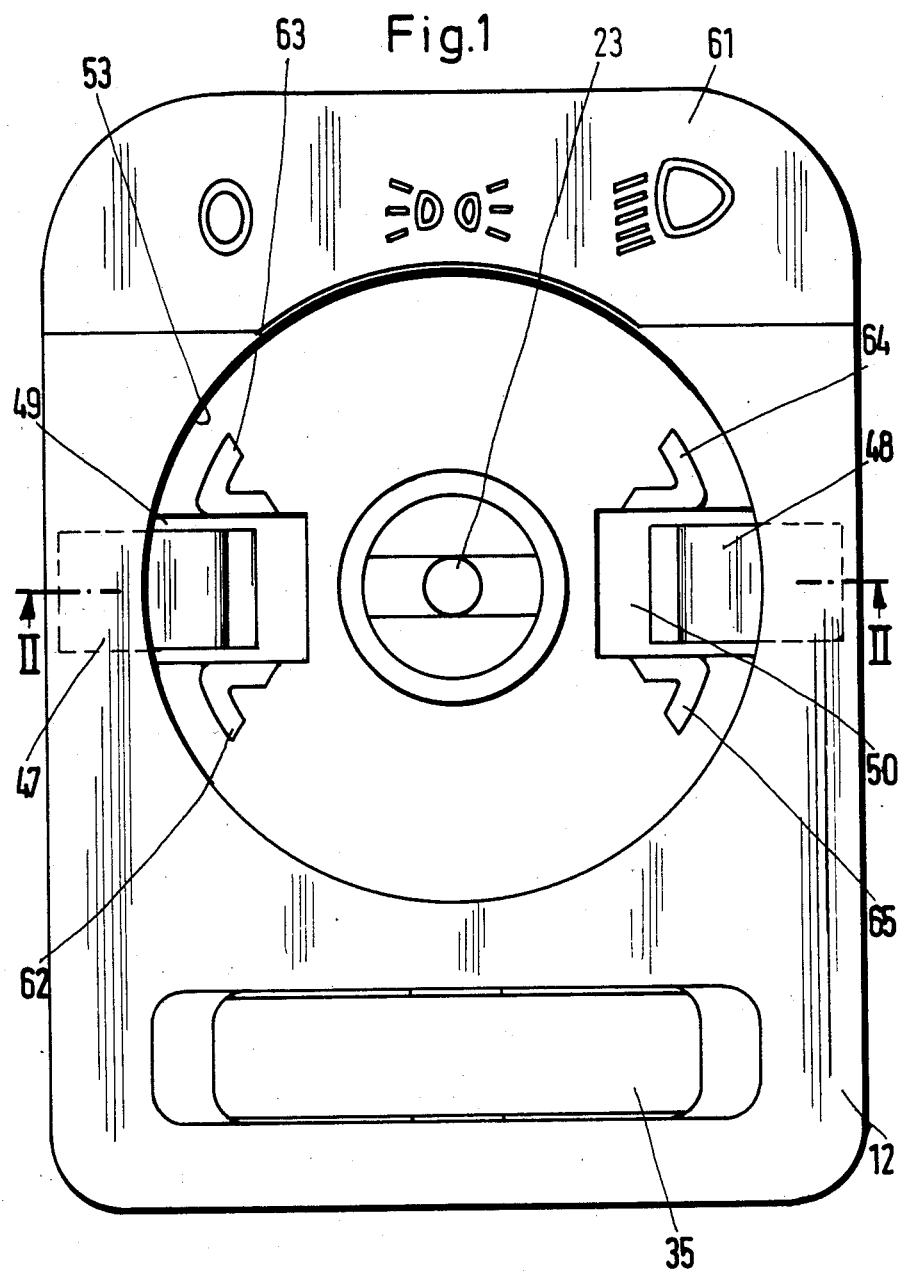
FIG. 1 is a view of the front plate of a switch according to the invention.

The switch represents a light switch for motor vehicles and has a housing 10 with a rectangular cross-section. The housing 10 has a top part 11 with a front plate 12, from which four side walls 13, 14, 15 and 16 and a partition 17 arranged in parallel to the front wall 13 extend perpendicularly in downward direction. At approximately half the height of the housing 10 an intermediate piece 18 is arranged which rests upon the lower rim of the side wall 14 and upon the lower rim of the partition 17. The housing 10 is closed by a base plate 19, which is locked with the side walls 15 and 16 in the vicinity of the lower rims of the side walls 15 and 16. The front plate 12 has an aperture 20. In the portion of the intermediate piece 18 lying underneath aperture 20 there is also an aperture 21. A cylindric switch shaft 23 is rotatably and axially displaceably guided through the apertures 20 and 21. Switch shaft 23 is held in its switching position by means of two locking leaf springs 24 and 25, which are guided on two side walls 26 and 27 of the intermediate piece 18. Above the intermediate piece 18 a light guide 28 is connected with the switch shaft 23 in a manner protected against twisting. Light guide 28 overlaps an incandescent lamp 29. Lamp 29 is arranged on the base plate 19 of the housing 10 and penetrates the intermediate piece 18 in the area of an aperture 30. A bridging contact 31 can be carried by the switch shaft 23 via light guide body 28. Bridging contact 31 is arranged below the intermediate piece 18, and includes a pin-shaped elongation 31b upon which the light guide body 28 acts. Elongation 31b penetrates the intermediate piece 18 through aperture 32. Bridging contact 31 can act upon several contact webs arranged upon the base plate 19, which contact webs are connected with the vehicle lights. A potentiometer 33 is positioned in the area of base plate 19. Potentiometer 33 is actuated by means of a slide spring 34 which is fastened on a knurled wheel 35, which in turn is rotatably mounted on the housing walls 13 and 17 and penetrates the front plate 12 through an aperture 36.

Figure 2:
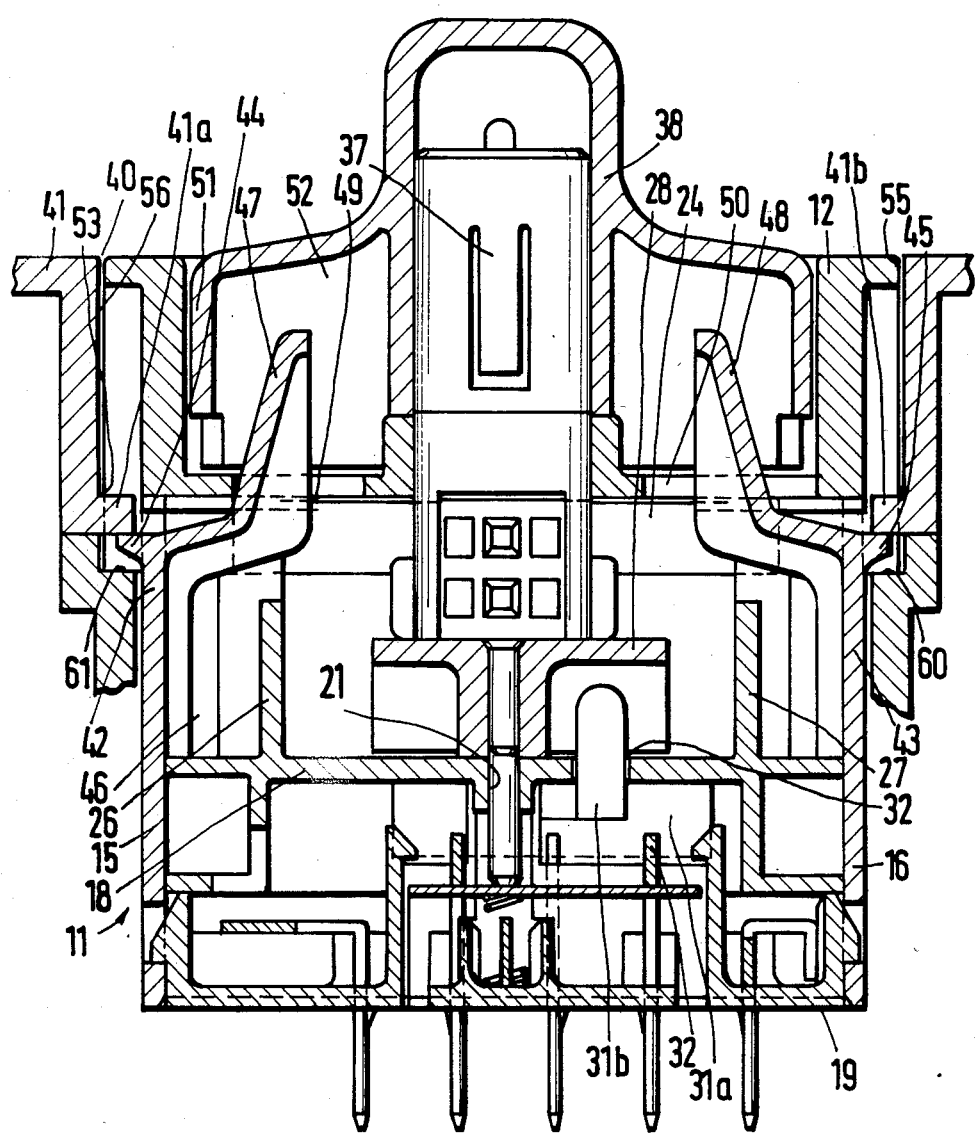
FIG. 2 is a section taken on the line II—II of FIG. 1.

As best shown in FIGS. 2 and 3, a spring shank 37 is cut in the upper end of switch shaft 23. A hollow switch control button 38 is lockingly secured to the switch shaft 23 by spring shank 37. The spring shank 37 projects in the downward direction laterally from the switch shaft 23 and engages in an aperture 22a shown in FIG. 3 which is worked into a partition 22 located in the interior of the switch control button 38. The switch control button 38 is furthermore supported on the switch shaft 23 via a resilient element formed as a pressure spring 39. As FIG. 2 shows, the switch is inserted in an opening 40 of the instrument panel 41 of the motor vehicle.

The switch is held in the opening 41 by means of two locking springs 42 and 43 which are formed onto the side walls 15 and 16 of the housing top 11 and project laterally from the respective side walls. When the switch is mounted, the locking springs 42 and 43 snap behind studs 41a and 41b of the instrument panel 41 by means of a stud 44 or 45. A release shank 47 or 48 extends from each locking spring 42 and 43 projecting into the housing interior 46. Each release shank 47, 48 ends in the area of an aperture 49 or 50 in the front plate 12 as FIG. 1 shows. As FIG. 2 furthermore illustrates, the release shanks 47 and 48 of the locking springs 42 and 43 penetrate the apertures 49 and 50 in the front plate 12 and project from the latter. The switch control button 38 has a cylindric tube-shaped portion 51 encompassing a hollow space 52 into which the release shanks 47 and 48 of the locking springs 42 and 43 project.

FIGS. 1 to 3 also illustrate that the switch control button 38 with its tube-shaped portion 51 is arranged in a cavity 53 of the front plate 12. The tube-shaped portion 51 rests upon the front plate 12 with little play. From the lower rim of the switch control button 38 a recess 54 is formed into the tube-shaped portion 51 as FIG. 3 shows. When the switch control button 38 is pulled to the position indicated by broken lines, spring shank 37 is accessible through recess 54. A pin-shaped tool can be inserted into recess 54 to press spring shank 37 inward. When spring shank 37 is pressed, the pressure spring 39 presses the switch control button 38 from the switch shaft 23. The release shanks 47 and 48 of the locking springs 42 and 43 are thereby uncovered. By pressing the release shanks 47 and 48 in the direction of switch shaft 23, the studs 44 and 45 can be moved away from the instrument panel 41 into the housing interior 46. Now the switch can be easily removed from the opening 40 of the instrument panel 41 by pulling it out of the opening 40 by means of the release shanks 47 and 48.

As FIG. 2 shows, the rim contour 55 of the front plate 12 is flush with the contour 56 of the opening 40 in the instrument panel 41. As FIGS. 4 and 5 show, two spring lugs 58 and 59 are arranged in the area of an aperture 57 in the side wall 15. Spring lugs 58 and 59 extend laterally of and approximately transversely to the longitudinal direction of the locking spring 42 and end below the stud 45 of the locking spring 42. In the area of the spring lugs 58 and 59, the side wall 15 is so wide that it is flush with the rim contour 55 of the front plate 12. Above and below and laterally of the spring lugs 58 and 59, the side wall 15 is narrower. Thus the spring lugs 58 and 59 are very solid. When the switch is inserted in the opening 40 of the instrument panel 41, the spring lugs 58 and 59 rest with elastic prestress against the limiting wall 50 of the opening 40 as seen from FIG. 2, whereas the stud 45 of the locking spring 42 rests under elastic prestress against the stud 41b of the instrument panel 41. Side walls 13 and 16 are provided with spring lugs (not shown in the drawing) in the same manner of wall 15. The spring lugs of the side wall 15 rest against the limiting wall 61 of the opening 40 extending in the same plane as the limiting wall 60. The spring lugs of the side wall 13 rest against a limiting wall (not shown in the drawing) of the opening 40 extending in the same plane as the limiting walls 60 and 61. Thus the switch is braced without play in the opening 40 of the instrument panel 41. When the release shanks 47 and 48 of the locking springs 42 and 43 are moved towards the imaginary longitudinal axis of the switch shaft 23 the spring lugs 58 and 59 press the switch out of the opening 40.

As FIGS. 1 and 3 show, cavity 53 does not surround the tube-shaped portion 51 over its entire perimeter, but only over an angular range of about 270°. In the other area, the front plate 12 extends in a lower plane and has a symbol disk 61 extending alongside the upper edge of the side wall 14 of the rectangular housing 10. The switch control button 38 is swivellable about an angle of about 90°, which in its size thus corresponds to the size of the extent of the tube-shaped portion 51 not located in the cavity 53 and is adapted to the size of the extent of the symbol disk 61. Thus the positions of the switch control button 38 can be clearly assigned to the symbols on the symbol disk 61. The swiveling motions of the switch control button 38 are limited by four stops 62, 63, 64 and 65, which are formed on the front plate 12 laterally of the apertures 49 and 50. The stops 62, 63, 64 and 65 project into the hollow space 52 of the switch control button 38 just as the release shanks 47 and 48 of the locking springs 42 and 43 and co-operate with inner walls (not shown in the drawing) of the switch control button 38. Thus they are invisible when the switch is used.

What is claimed is:

1. A switch assembly comprising:
   a housing inserted into an opening of a mounting plate, said housing
   comprising several side walls, a base plate and a front plate formed with an aperture, said housing containing switch means, said front plate bearing on an exterior surface of said mounting plate;
   a locking spring projecting laterally from at least one of said side walls for snapping behind said mounting plate when said switch assembly is inserted in the mounting plate and retaining said housing in said mounting plate; and
   a release shank projecting from said locking spring into the housing interior and ending adjacent said aperture in said front plate for moving said locking spring to a position where said housing can be removed from said mounting plate.

2. A switch assembly in accordance with claim 1 wherein said switch means includes a switch control button; said aperture being covered by said switch control button at least from one direction of view.

3. A switch assembly in accordance with claim 2, wherein:
   said switch control button permits access to said aperture only in one of several positions.

4. A switch assembly in accordance with claim 2 wherein: said switch control button is detachably fixed on a switch shaft forming part of said switch means.

5. A switch assembly in accordance with claim 4, wherein:
   said switch control button is detachably fixed on said switch shaft via fastening means; and
   said fastening means being only accessible in one of several positions of said switch control button.

6. A switch assembly in accordance with claim 2, wherein:
   said release shank penetrates said aperture and projects beyond said exterior surface of said front plate.

7. A switch assembly in accordance with claim 6, wherein:
   said switch control button rests upon said front plate least in one of its switching positions;
   said switch control button having a hollow space; and
   that said release shank projects into said hollow space.

8. A switch assembly in accordance with claim 7, wherein: said switch control button is swivellable into several switching positions and has a tube-shaped portion extending from its outer periphery toward said front plate, said tube-shaped portion surrounding said aperture and said release shank.

9. A switch assembly in accordance with claim 8, wherein:
   said fastening means are arranged between said switch control button and said switch shaft in the area of said tube-shaped portion;
   said switch control button with its tube-shaped portion is arranged in a cavity of said front plate and has a recess in its tube-shaped portion through which recess said fastening means are accessible in one switching position.

10. A switch assembly in accordance with claim 9, wherein:
    said cavity does not surround the entire circumference of said tube-shaped portion.

11. A switch assembly in accordance with claim 10 comprising: stops arranged on said front plate for limiting movement of said switch control button; said stops project into a hollow space of said switch control button.

12. A switch assembly in accordance with claim 11, wherein:
    said switch control button is axially adjustable; and
    said recess is only exposed in a particular axial switching position of said switch control button.

13. A switch assembly in accordance with claim 1, comprising:
    a resilient lug is arranged on at least one of said side walls, said lug extending transversely to the longitudinal direction of said locking spring and resting under prestress against a limiting wall of said opening in said mounting plate.

14. A switch assembly in accordance with claim 1, wherein:
    said release shank penetrates said aperture and projects from said front plate.

* * * * *